United States Patent [19]

Dreschmann et al.

[11] Patent Number: 4,650,195
[45] Date of Patent: Mar. 17, 1987

[54] ANTI-FRICTION BEARING SEAL

[75] Inventors: Peter Dreschmann, Dittelbrunn; Wilhelm Walter, Reith, both of Fed. Rep. of Germany

[73] Assignee: FAG Kugelfischer Georg Schafer (KGaA), Fed. Rep. of Germany

[21] Appl. No.: 853,633

[22] Filed: Apr. 18, 1986

[30] Foreign Application Priority Data

May 30, 1985 [DE] Fed. Rep. of Germany ....... 3519598

[51] Int. Cl.$^4$ .......................... F16J 15/32; F16C 33/72
[52] U.S. Cl. ........................................ 277/50; 277/152; 277/178; 384/477; 384/484
[58] Field of Search ..................................... 277/47–50, 277/152, 153, 178; 384/477, 484–486

[56] References Cited

U.S. PATENT DOCUMENTS

| 3,396,977 | 8/1968 | Iguchi | 384/477 X |
| 3,848,938 | 11/1974 | Stella et al. | 384/484 X |
| 4,449,717 | 5/1984 | Kitawaki et al. | 277/153 |

FOREIGN PATENT DOCUMENTS

| 700811 | 12/1953 | United Kingdom | 277/152 |
| 1057629 | 2/1967 | United Kingdom | 277/152 |
| 1098451 | 1/1968 | United Kingdom | 384/477 |

Primary Examiner—Robert S. Ward
Attorney, Agent, or Firm—Ostrolenk, Faber, Gerb & Soffen

[57] ABSTRACT

A seal for an anti-friction bearing, which bearing includes an outer and inner ring and rolling elements riding between them. At the inner ring, the seal includes an axially outwardly extending leg of membrane, the radially inward side of which carries two axially spaced apart sealing ridges which are resiliently biased against the inner ring for effecting a seal. In the above axial membrane, there is an additional membrane of smaller cross section formed by a radial constriction of that axial membrane between the two sealing ridges, which makes the support of the axially outward sealing ridge more flexible. The distance between the sealing ridges is at least equal to the axial clearance in the completed installed bearing.

10 Claims, 2 Drawing Figures

ANTI-FRICTION BEARING SEAL

BACKGROUND OF THE INVENTION

The present invention relates to a seal for an anti-friction bearing. The seal includes lips or ridges which engage at least one of the rings of the bearing to effect the seal.

Federal Republic of Germany No. AS 24 14 643 discloses a multi-lip shaft seal in which two radially acting sealing lips are connected to each other by an axially-extending membrane or neck part. This avoids undesired influence of the sealing lips with respect to each other upon the tilting of the shaft.

Federal Republic of Germany No. OS 19 39 597 discloses a double-lip seal in which two radially directed sealing lips point in the same direction. This arrangement requires a large amount of axial space. In known seals, furthermore, inaccuracies resulting from tolerances do not result in unambiguous application forces. The seals, shown in these disclosures in half cross-section, must be seen as ring-shaped parts. The application force of the sealing lips or sealing ridges results from the amount of their widening upon being pulled onto the inner ring or onto the shaft respectively and from the bending up or deformation of the sealing axial membrane upon installation. Since the two cannot be exactly determined, the application force, and thus the moment of friction, is also imprecise. For this reason, a spring which presses one of the sealing lips against the shaft has also been suggested in the seal in Federal Republic of Germany No. AS 24 14 634. In this way, to be sure, the application force and the moment of friction are also increased.

These are cases in which one sealing lip on the seal is sufficient to protect the bearing from the penetration of dirt. However, as a result of axial clearance, for instance in the case of deep-groove ball bearings, there is a disadvantage that axial movement of the shaft can take place. It corrosion has set in alongside the place of travel of the seal, under environmental conditions which are unfavorable when the bearing is at a standstill, and if upon axial movement, the corrosion has moved to below the sealing lip, this reduces the life of the seal and of the bearing.

SUMMARY OF THE INVENTION

The object of the present invention is to develop a seal of the aforementioned type that the aforementioned disadvantages are avoided, the application forces and moments of friction which occur in operation are slight and definable, and the formation of corrosion does not degrade the operability of the seal.

According to the invention, there is in an anti-friction bearing which includes an outer ring, an inner ring, rolling elements, such as balls, and a cage. A gap between the rings which must be sealed.

A respective seal is installed at each axial side of the bearing, and the body of the seal extends between and contacts both rings closing off the space between the rings. At at least one radial side of the seal there is an axially extending, outwardly directed leg or membrane of the seal which is connected to the body of the seal. That membrane or leg itself may be of resilient material or the connection between the membrane and the body may be resilient or the entire seal may be resilient. The above noted resilience urges the membrane radially toward the ring which it is adjacent.

On the ring are a pair of radially directed sealing lips or sealing edges which are axially slightly spaced apart and which are resiliently urged against the respective ring. Axially between the sealing lips or ridges, there is an additional membrane of smaller cross-sectional or radial thickness. This has the effect of permitting greater play in the axial membrane or leg at the axially more outward lip or ridge, while the axially more inward lip or ridge provides the main seal. In the preferred form, that additional membrane between the sealing lips or ridges is formed by a radial narrowing or constriction in the leg or axial membrane.

To assure that there is good, long duration seal by the sealing lips or ridges and particularly by the main, axially inward sealing lip, the distance between the sealing lips or ridges is equal to or greater than the axial clearance of the installed anti-friction bearing. This assures that if corrosion develops on the sealed ring, the corrosion will remain axially outward of the main, axially inward sealing lip and this will enable the bearing to have a longer life.

In the preferred version, the axial membrane or leg is defined only at the inner ring, while the seal is secured at the outer ring without a corresponding axial membrane.

The additional membrane of smaller cross section enables the application forces of the sealing lips or sealing ridges to be independent of each other. The front or axially outward lip, which is intended predominantly for standstill, dependably protects the travel place of the main or axially inward lip from corrosion. But, the front lip has only a very slight moment of friction. Due to the fact that the distance between the sealing lips or sealing ridges is greater than or equal to the axial clearance of the installed anti-friction bearing, there is dependable assurance that the main lip does not travel over a corroded place of travel. Furthermore, such a seal takes up only a small amount of space axially.

The invention will be explained in further detail with reference to an embodiment.

DESCRIPTION OF THE PREFERRED EMBODIMENT

Figure 1:
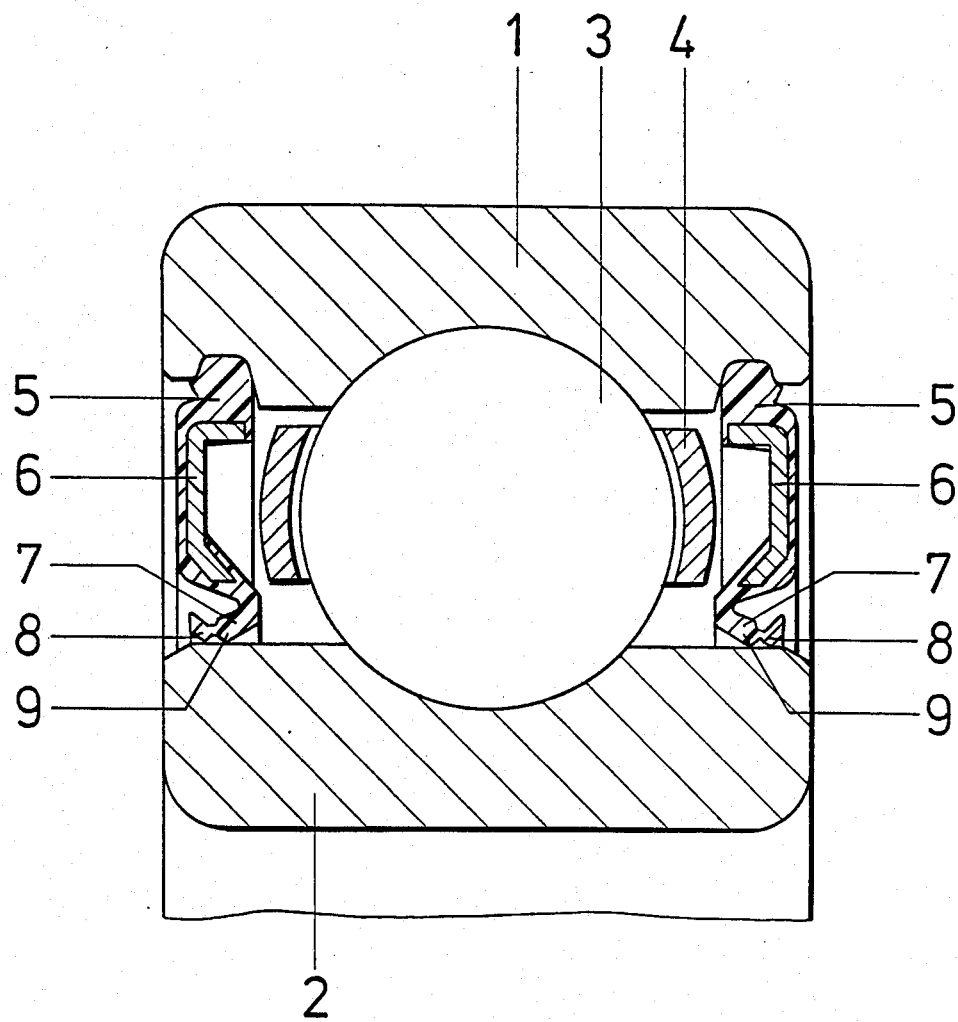
FIG. 1 shows a cross section through a deep-groove ball bearing provided with seals in accordance with the invention.

The deep-groove ball bearing shown in FIG. 1 comprises an outer ring 1, an inner ring 2, the rings including grooved raceways, the balls 3 which ride along the raceways and a cage 4. There is an annular open space or gap between the rings. Two annular seals 5 are snapped in place in the outer ring 1 for closing the axial ends of that open space between the rings. Each seal is of resilient material. It extends from an annular pocket or groove in the outer ring to the inner ring. Its body is supported by a radial holding part 6.

At the inner ring, the seal has an axial membrane 7 which is attached to the seal at its axially inward end and is thereby biased toward the inner ring. There are arranged on the radially inward side of the membrane 7 two radially directed sealing lips or ridges 8 and 9. Instead of seating in a pocket at the outer ring, the seal may include a membrane like membrane 7 at the outer ring which seals to the outer ring.

Figure 2:
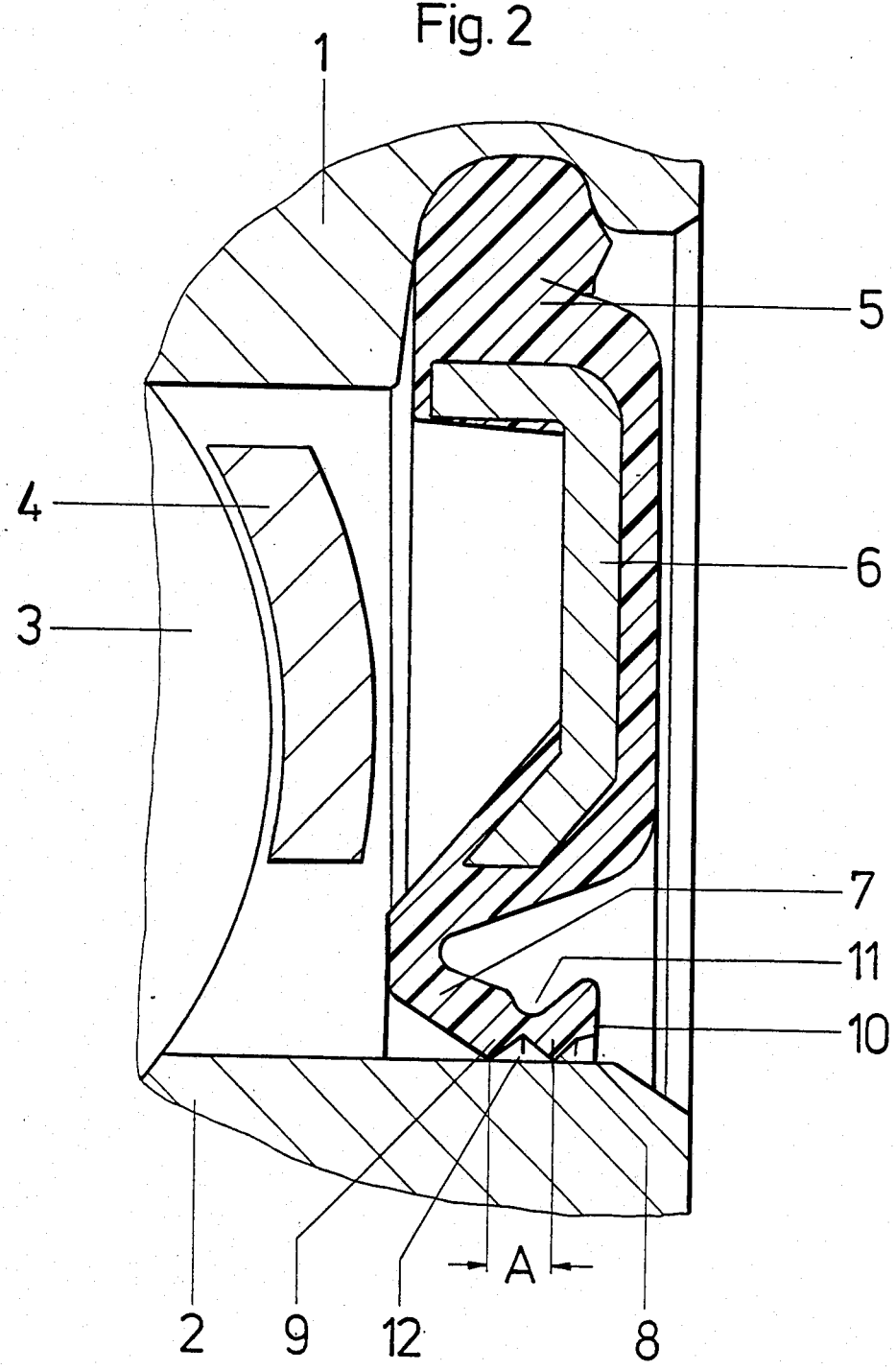
FIG. 2 is an enlarged view of the development of the sealing ridges.

As can be noted from FIG. 2, an additional membrane 10 is arranged between the sealing ridges 8 and 9. This additional membrane is formed by the constrictions 11 and 12 which narrow the radial thickness of the membrane 7.

In the embodiment shown, the sealing ridge 8 forms the axially outward front lip, which is active practically only in standstill. The axially inward sealing ridge 9 forms the main lip, which is active both in operation and in standstill. The differences in operations of the two lips results from the reduced cross-section of the additional membrane.

The additional membrane 10 makes possible a low application force and thus a low moment of friction of the sealing ridge 8, which makes it also substantially independent of the application forces of the sealing ridge 9.

The elements of the bearing have normal clearances which enable some axial shifting of the rings with respect to each other. The ridges 8 and 9 are spaced apart a distance at least equal to that axial shifting which the clearances permit.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A seal for an anti-friction bearing for sealing the space between the rings of the bearing:
   the seal comprising an annular body for being disposed in the space between the rings, the body having a radially outward and a radially inward portion and a radially extending holding part between those portions;
   at one of the inward and outward end portions of the body, an axially extending membrane is connected with the radial holding part, the membrane extending axially outwardly with respect to the bearing and is resiliently biased radially toward the adjacent ring of the bearing; the axially extending membrane having a pair of axially spaced apart sealing ridges defined thereon and facing toward the respective ring of the bearing at which the membrane is disposed for being resiliently biased against that ring;
   an additional membrane between the axially spaced apart sealing ridges, the additional membrane being of smaller cross section than the remainder of the axially extending membrane.

2. The seal of claim 1, wherein the additional membrane is formed by a constriction in the radial thickness of the axial membrane between the sealing ridges.

3. The seal of claim 1, wherein the axial membrane is supported to the body of being resiliently biased toward the respective adjacent ring.

4. The seal of claim 3, wherein the seal is comprised of resilient material.

5. The seal of claim 1, wherein the axial membrane is defined at one radial end portion of the seal.

6. The seal of claim 5, wherein the axial membrane is defined at the radially inward end portion of the seal for contacting the inner ring of the bearing.

7. The seal of claim 1, wherein the axial membrane is defined at the radially inward end portion of the seal for contacting the inner ring of the bearing.

8. In combination, an anti-friction bearing comprising an outer ring, an inner ring radially inwardly of the outer ring and spaced therefrom for defining a space between the rings, and rolling elements disposed between the inner and outer rings for riding therealong; and the seal of claim 1 for installation in the space between the outer and the inner rings; the sealing ridges on the axial membrane engaging a respective one of the rings of the bearing.

9. The combination of claim 8, wherein the other of the rings of the bearing includes an annular groove therein and the seal includes an annular projection which seats in the groove in the other ring for effecting a seal at that radial end portion of the seal.

10. The combination of claim 8, wherein between the rings and the rolling elements, there is a normal axial clearance in the installed bearing; the distance between the sealing ridges is at least equal to the axial clearance of the bearing.

* * * * *